Oct. 3, 1961     C. D. FLANAGAN     3,002,386

THERMOSTATS

Filed Oct. 29, 1957

Charles D. Flanagan,
Inventor.
Koenig and Pope,
Attorneys.

United States Patent Office 3,002,386
Patented Oct. 3, 1961

3,002,386
THERMOSTATS
Charles D. Flanagan, Attleboro, Mass., assignor to Texas Instruments Incorporated, Dallas, Tex., a corporation of Delaware
Filed Oct. 29, 1957, Ser. No. 693,131
10 Claims. (Cl. 73—378.3)

This invention relates to thermostats, and more particularly to snap-acting thermostatic elements made from thermostat materials adapted for use at high working temperatures (1000° F. or higher, for example).

Among the several objects of the invention may be noted the provision of novel snap-acting thermostatic elements made from composite thermostat materials suitable for use at higher temperatures than heretofore possible; the provision of snap-acting thermostatic elements made from composite thermostat materials which have significantly higher electrical resistivity than available with known bimetals; the provision of snap-acting thermostatic elements made from thermostat materials which, in addition to the stated characteristics, have high fatigue strength and low creep characteristics; and the provision of snap-acting thermostatic elements such as described which are economical to manufacture.

The invention is based on my discovery that it is possible to use as one expansion component of a snap-acting thermostatic element made of composite thermostat material a layer comprising a refractory nonmetallic material, and more particularly a vitrified ceramic material. In the case in which a snap-acting thermostatic element is to be used for carrying current, and high resistivity is desired, the high expansion component of the composite material thereof may be a refractory electrical resistance metal or alloy. Utilizing such a metal or alloy for one expansion component and a nonconductive non-metallic material as the other expansion component avoids the difficulty encountered with bimetals that, while one layer of a bimetal may consist of a metal having high resistivity, it is usually necessary to bond this to a layer of a metal having a lower resistivity, thus losing the benefit of the high resistivity of the first layer. If the snap-acting thermostatic element is to be used as a nonconductive thermostatic element, the low expansion layer of the composite material thereof may comprise one refractory nonmetallic material and the high expansion layer may comprise a different refractory nonmetallic material having a higher thermal coefficient of expansion. The term "refractory," as to both alloys and the nonmetallic materials, is used in the sense of high temperature resistance. The term "metal" as used herein includes alloys. Other objects and features will be in part apparent and in part pointed out hereinafter.

The invention accordingly comprises the products hereinafter described, the scope of the invention being indicated in the following claims.

In the accompanying drawings, in which several of various possible embodiments of the invention are illustrated:

Corresponding reference characters indicate corresponding parts throughout the several views of the drawings.

Figure 1:
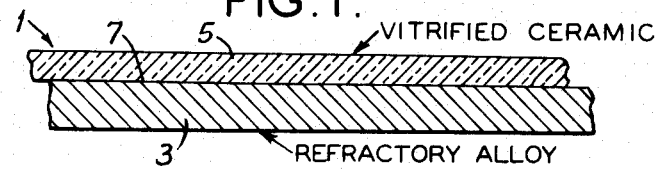
FIG. 1 is a cross section, with thicknesses exaggerated, of a first type of composite sheet thermostat material usable in a snap-acting thermostatic element of this invention.

Referring to the drawings, FIG. 1 shows a first type of sheet thermostat material usable in a snap-acting thermostatic element of this invention, this material being a composite two-layer material 1. The layers of this material are designated 3 and 5. Layer 3 is a metal layer, consisting of a refractory alloy. In case the thermostatic material is to be used for current-carrying electrical resistance thermostatic elements, this alloy in addition to being refractory is an electrical resistance alloy. Layer 5, instead of being a metal layer as in the conventional bimetal, is a layer of a nonmetallic refractory nonconductive material, and more particularly a vitrified ceramic material, having a thermal coefficient of expansion different from that of the layer 3. The layers 3 and 5 are bonded at their interface 7, and each is flexible.

Examples of suitable refractory alloys that may be used for the layer 3 are stainless steels, such as No. 403 and No. 430; Nichrome V (80% Ni, 20% Cr); Nichrome (60% Ni, 16% Cr, 24% Fe); super alloys, such as 60% Ni, 6% Fe, 34% Mo or 20% Cr, 20% Ni, 6% Mo, 54% Co; and an alloy consisting of 72% Mn, 18% Cu, 10% Ni.

Examples of suitable refractory ceramic materials that may be used for the layer 5 are zirconium oxide ($ZrO_2$); zircon ($ZrO_2 \cdot SiO_2$); alumina ($Al_2O_3$); cordierite ($2MgO \cdot 2Al_2O_3 \cdot 5SiO_2$); forsterite ($2MgO \cdot SiO_2$); and steatite ($MgO \cdot SiO_2$). A frit may also be used which chiefly comprises 46% $SiO_2$ and 15% boric acid, with additions of calcium oxide, magnesium oxide, barium oxide, aluminum oxide and zirconium oxide, sold under the trade designation "Solaramic 5210-2C" by Solar Aircraft Co. Cermets may also be employed, consisting of a powdered metal in a ceramic base, such as metallic cobalt powder in powdered titanium carbide.

The thickness of the ceramic layer 5 may range from approximately one-fourth the thickness of the metal layer to approximately four times the thickness of the metal layer. No substantial amount of useful work can be obtained by thermostatic action from material in which the ratio of the thickness of the ceramic layer to the thickness of the metal layer is outside this range.

In cases where the melting point of the metal layer is higher than the vitrification temperature of the ceramic material, the composite sheet material may be made as follows: The metal layer is cleaned of oxides as by conventional pickling or in any other suitable manner. The ceramic material in powder form is mixed with water to form a slurry or slip. The slurry is applied in a thin coat to the metal in any suitable way, as by brushing, roller coating or spraying, and allowed to dry. Then the coated metal is fired at high temperature (2100° F., for example, in the case of the above-mentioned frit) to vitrify the ceramic material and to effect diffusion of the ceramic material into the metal to bond the vitrified ceramic layer 5 to the metal. Layer 5 is in the nature of a vitreous enamel coating on the layer 3. It is made thin enough to be able to flex without cracking. Even when layer 5 is thus made thin, the compound sheet material exhibits highly satisfactory thermostatic action, having high fatigue strength, and, in the case of its use for snap-acting thermostatic elements, having low creep characteristics.

In cases where the melting point of the metal layer is below the vitrification temperature of the ceramic layer, the composite sheet material may be made by spraying molten ceramic material on the metal layer as disclosed in the copending coassigned application of Unto U. Savolainen entitled Thermostats, Serial No. 693,116, filed October 29, 1957, and now abandoned. The spraying method may also be used in cases where the melting point of the metal layer is higher than the vitrification temperature of the ceramic material.

As to ceramics having high melting points, it is possible to lower the melting point by adding a glass thereto. By way of example, a ceramic such as alumina has a softening point of over 1900° C. whereas a composition made up of 90% alumina with the remainder silicon oxide, magnesium oxide and calcium oxide would have a softening temperature of approximately 1600° C.

Figure 2:
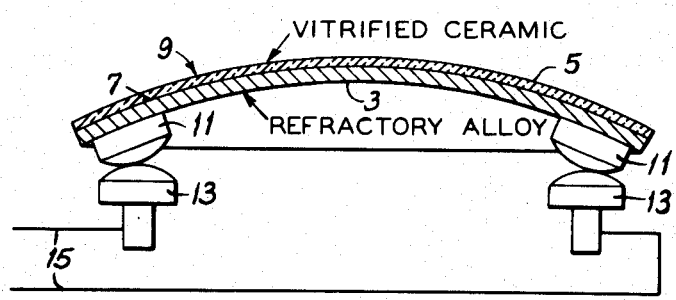
FIG. 2 is a cross section showing a current-carrying snap-acting thermostatic disk element made from material such as illustrated in FIG. 1, also showing circuit connections for the disk element; and, FIGS. 3 and 4 are cross sections similar to FIG. 1 showing second and third types of composite sheet thermostat material usable in a snap-acting thermostatic element of this invention.

Thermostatic sheet material such as above described may be made into any desired form of thermostatic element, for example the dished snap-acting disk 9 illustrated in FIG. 2, having contacts 11 welded to the metal layer 3. It will be understood that such a disk is used in conjunction with fixed contacts 13 connected in an electrical circuit as indicated at 15, the disk being mounted as shown, for example, in United States Patent 2,199,387 issued May 7, 1940. The disk normally is dished as shown in solid lines in FIG. 2 for engagement of contacts 11 with contacts 13. Under these circumstances, current flows through the metal layer 3 of the disk. Layer 5 being nonconductive, flow of current is confined to metal layer 3, as distinguished from the conventional bimetal in which current flows through both layers. Accordingly, the overall resistivity of the element is that of the metal layer 3 alone and higher than if two metal layers were used.

As specific examples of the above, a dished disk of No. 403 stainless steel one and one-half mils thick and one-half inch in diameter coated on one side with one mil of the above-mentioned frit (fired at 2100° F.), and a dished disk of No. 403 stainless steel three mils thick and three-fourths inch in diameter coated on one side with approximately two mils of the above-mentioned frit (fired at 2100° F.) exhibited satisfactory thermostatic snap action.

Figure 3:
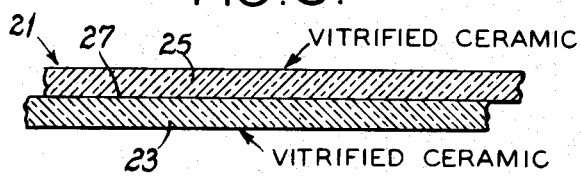

FIG. 3 shows another type of sheet thermostat material usable in a snap-acting thermostatic element of this invention, a composite two-layer material 21, the layers of which are designated 23 and 25, each of the layers in this case comprising a nonconductive vitrified refractory material. The layers have different thermal coefficients of expansion, are bonded together at their interface 27, and each is thin enough to be flexible. Such material may be prepared by fusing together two compatible vitrified refractory films, or by applying a slurry or slip of one refractory material to a compatible vitrified film of the other material and then firing. Single vitrified films may be formed by applying a slurry to a backing sheet of well oxidized metal, and then firing. The resultant vitrified films are readily stripped from the metal because the oxide on the metal precludes bonding diffusion. Combinations of any two compatible refractory ceramics as above described may be used. For example, cordierite may be combined with forsterite or zirconium oxide. If desired, one layer may be made a high electrical resistance layer by using a suitable cermet in which the resistivity of the metal particles per se of the cermet and the contact area of the metal particles with one another are such that the cermet has high resistance.

Figure 4:
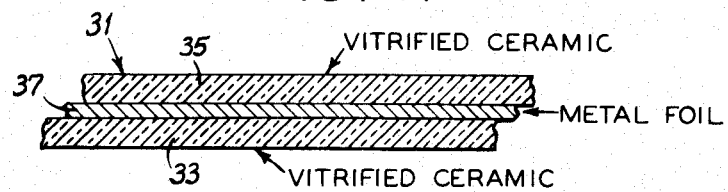

FIG. 4 shows still another type of sheet thermostat material 31 usable in a snap-acting thermostatic element of this invention, characterized by very high electrical resistance properties. This material 31 is a three-layer material, the outside layers being designated 33 and 35, the intermediate layer being designated 37. The intermediate layer consists of thin metal foil, the metal being a refractory electrical resistance alloy. Layer 33 is a layer of one refractory nonconductive ceramic material, and layer 35 is a layer of another refractory nonconductive ceramic material having a different thermal coefficient of expansion from layer 33. Alloys and ceramics as previously described may be used.

It will be understood that thermostatic elements of this invention are not limited to high temperature use, though particularly suitable for such use because of the capability of the material to withstand high temperatures.

In view of the above, it will be seen that the several objects of the invention are achieved and other advantageous results attained.

As various changes could be made in the above products without departing from the scope of the invention, it is intended that all matter contained in the above description or shown in the accompanying drawings shall be interpreted as illustrative and not in a limiting sense.

I claim:
1. A snap-acting thermostatic element comprising two layers of refractory materials having different thermal coefficients of expansion, one of said layers comprising a nonmetallic material bonded to the other layer, each of said layers being flexible, both of said layers being permanently shaped so that said element is permanently set according to a dished configuration such that said element is capable of snapping in response to temperature change to an oppositely dished configuration, said one layer comprising a vitrified ceramic material.
2. A snap-acting thermostatic element as set forth in claim 1 wherein said one layer comprises a cermet.
3. A snap-acting thermostatic element as set forth in claim 1 wherein the other of said layers comprises a refractory alloy.
4. A snap-acting thermostatic element as set forth in claim 3 wherein said one layer comprises a cermet.
5. A snap-acting thermostatic element as set forth in claim 3 wherein said alloy is an electrical resistance alloy.
6. A snap-acting thermostatic element as set forth in claim 5 wherein said one layer comprises a cermet.
7. A snap-acting thermostatic element adapted for high temperature use comprising a layer of a refractory electrical resistance alloy and a layer of a vitrified ceramic material on one face of the alloy layer bonded to the alloy layer by diffusion of the ceramic material into the alloy layer, the layers having different thermal coefficients of expansion and each being flexible, both of said layers being permanently shaped so that said element is permanently set according to a dished configuration such that said element is capable of snapping in response to temperature change to an oppositely dished configuration.
8. A snap-acting thermostatic element as set forth in claim 7 wherein the thickness of the layer of ceramic material is within the range from approximately one-fourth to four times the thickness of the alloy layer.
9. A snap-acting thermostatic element comprising a layer of metal and a layer of ceramic material on one face of the metal layer bonded thereto by diffusion of the ceramic material into the metal layer, the layers having different thermal coefficients of expansion and each being flexible, both of said layers being permanently shaped so that said element is permanently set according to a dished configuration such that said element is capable of snapping in response to temperature change to an oppositely dished configuration.
10. A snap-acting thermostatic element as set forth in claim 9 wherein the thickness of the layer of ceramic material is within the range from approximately one-fourth to four times the thickness of the metal layer.

References Cited in the file of this patent

UNITED STATES PATENTS

| | | |
|---|---|---|
| 150,566 | Guest | May 5, 1874 |
| 2,573,686 | Blinn et al. | Nov. 6, 1951 |
| 2,714,642 | Kinsley | Aug. 2, 1955 |
| 2,819,365 | Epstein | June 7, 1958 |

FOREIGN PATENTS

| | | |
|---|---|---|
| 663,355 | Germany | Aug. 26, 1938 |